United States Patent [19]

Glatfelter

[11] Patent Number: 4,681,511
[45] Date of Patent: Jul. 21, 1987

[54] LOW VIBRATION HELICOPTER ROTOR

[75] Inventor: Edward W. Glatfelter, Newton Square, Pa.

[73] Assignee: The Boeing Company, Seattle, Wash.

[21] Appl. No.: 782,238

[22] Filed: Sep. 30, 1985

[51] Int. Cl.$^4$ .................................................. B64C 27/43
[52] U.S. Cl. .................................... 416/131; 416/140; 416/141
[58] Field of Search ............... 416/138 A, 140 A, 102, 416/500, 148, DIG. 2, 114, 131 A, 98, 135 B, 141, 136 A

[56] References Cited

U.S. PATENT DOCUMENTS

| | | | |
|---|---|---|---|
| 2,465,703 | 3/1949 | Allen | 416/138 A |
| 2,531,598 | 11/1950 | Avery | 416/135 B |
| 2,670,051 | 2/1954 | Hohenemser | 416/102 |
| 2,672,202 | 3/1954 | Pullin et al. | 416/140 A X |
| 2,686,570 | 8/1954 | Haig | 416/141 |
| 2,754,915 | 7/1956 | Echeverria | 416/DIG. 2 X |
| 2,946,390 | 7/1960 | Pozgay | 416/138 A X |
| 3,623,682 | 11/1971 | Kretz | 416/140 A X |
| 4,131,391 | 12/1978 | Robinson | 416/140 A |
| 4,569,629 | 2/1986 | Ferris et al. | 416/140 A X |

FOREIGN PATENT DOCUMENTS

| | | | |
|---|---|---|---|
| 14365 | 11/1934 | Australia | 416/102 |
| 567041 | 12/1932 | Fed. Rep. of Germany | 416/141 |
| 630465 | 12/1927 | France | 416/131 A |
| 1024980 | 4/1953 | France | 416/138 A |
| 6500475 | 4/1966 | Netherlands | 416/141 |

Primary Examiner—Everette A. Powell, Jr.
Attorney, Agent, or Firm—Jones, Tullar & Cooper

[57] ABSTRACT

A low vibration helicopter rotor including a four-bar linkage arrangement which permits the straight line connecting the center of gravity of each pair of diametrically opposed rotor blades to intersect the rotor hub geometrical center at all cyclic conditions.

10 Claims, 5 Drawing Figures

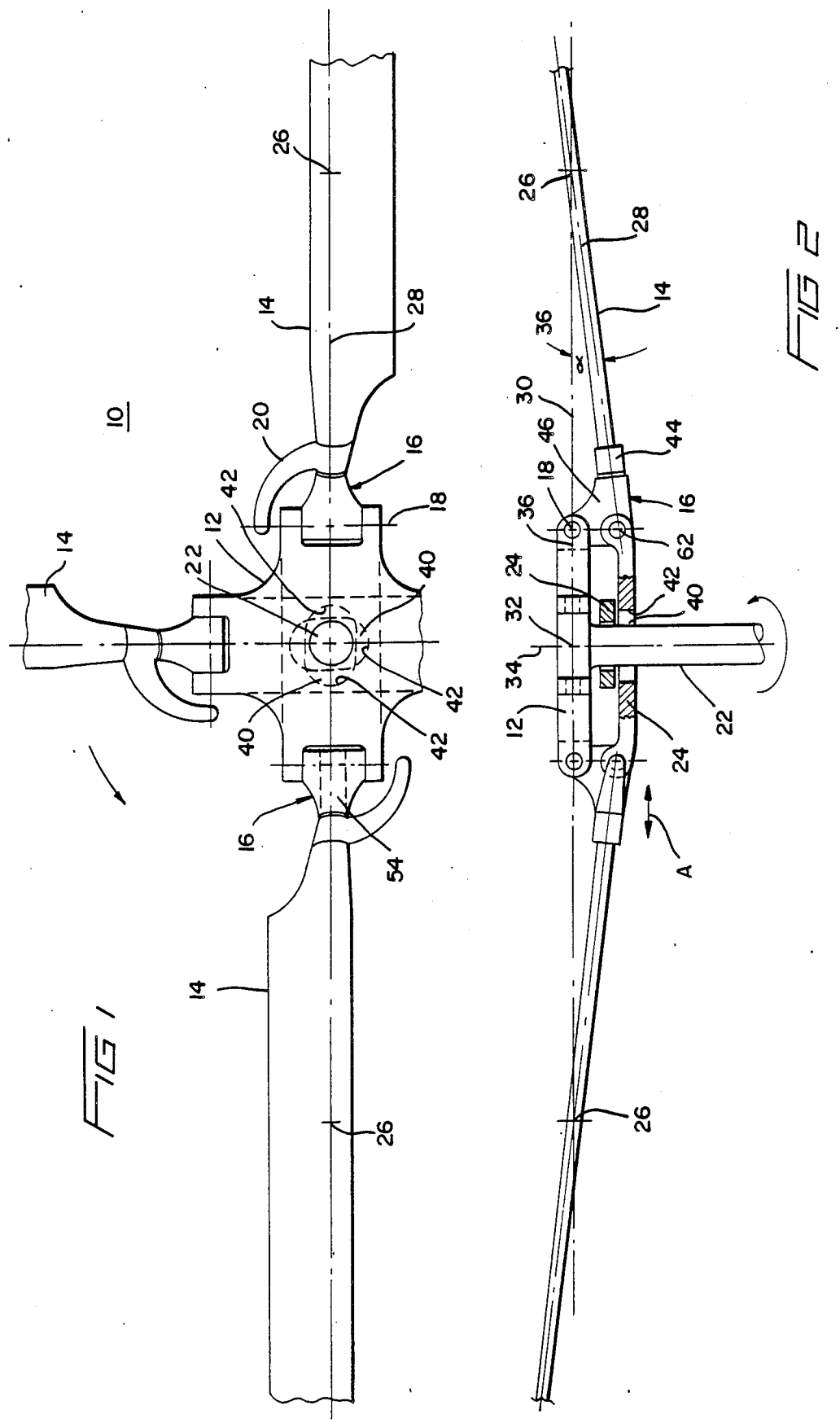

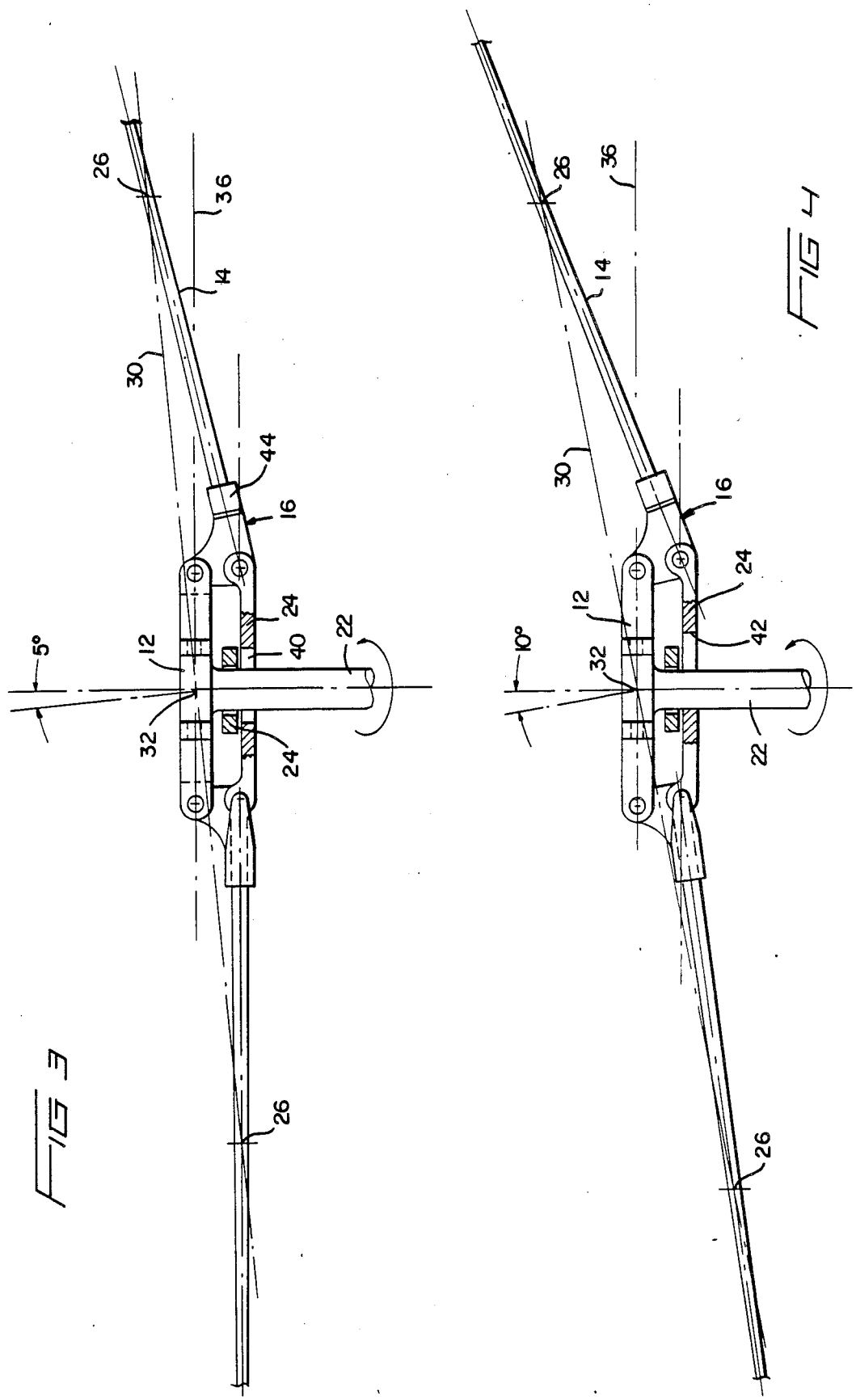

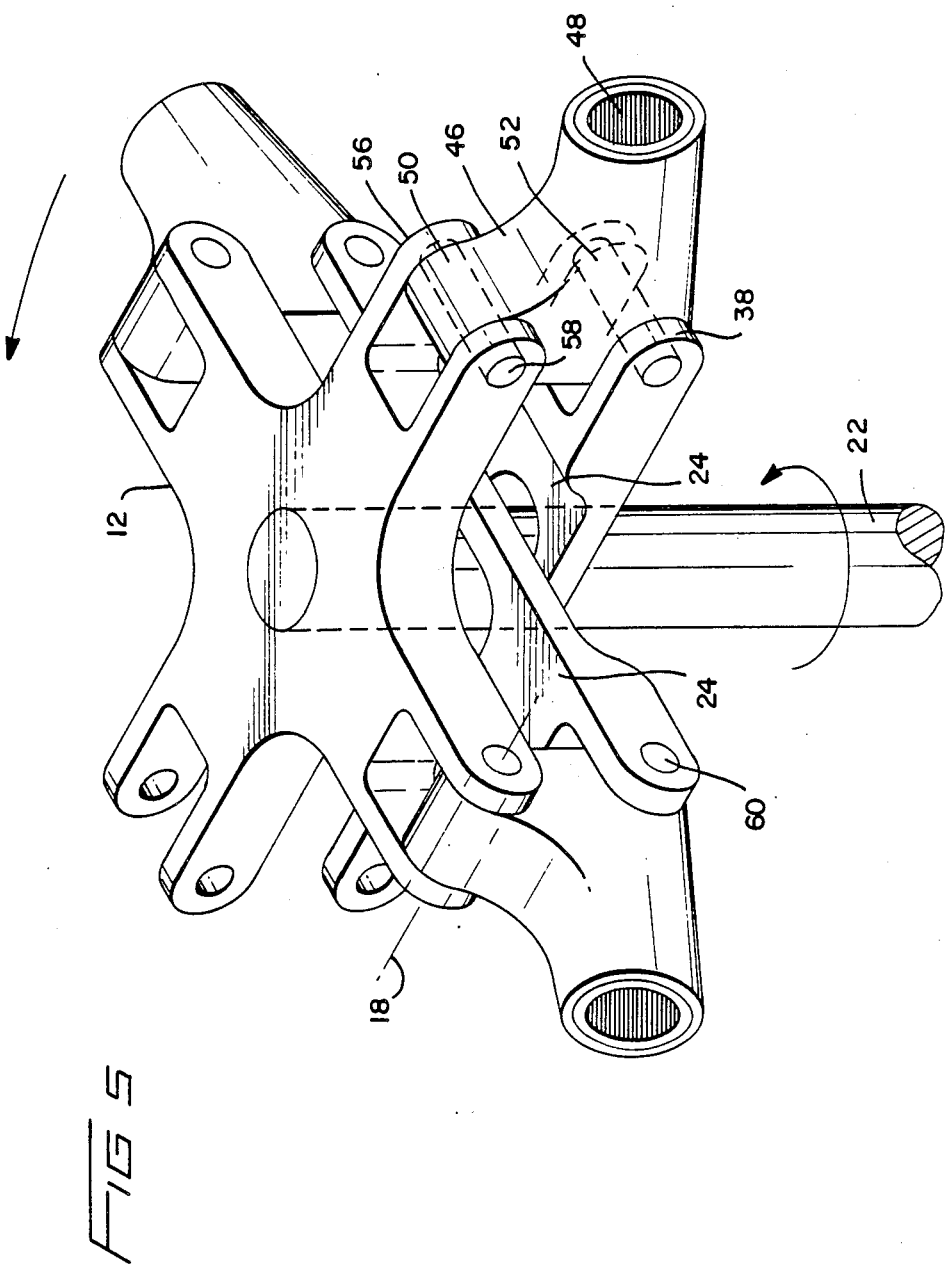

LOW VIBRATION HELICOPTER ROTOR

TECHNICAL FIELD

The present invention relates to a helicopter rotor, and in particular to a low vibration helicopter rotor, and to a method of vibration reduction.

BACKGROUND DISCUSSION

Helicopters by their very nature experience vibration, particularly in forward flight when rotor blade flapping is highest. Despite a variety of known methods and systems presently used in helicopters to suppress vibration to acceptable levels, it continues to increase maintenance time and cost, require added weight to assure fatigue strength, reduce riding comfort, and degrade crew performance on extended missions. In some cases, vibration even limits speed, because it increases at higher speeds and can exceed allowable levels while additional engine power is still available. If vibration could be greatly reduced throughout the flight regime, the helicopter would gain immensely in utility.

Most helicopter vibration originates in periodic airloads on the rotor blades. These airloads, which occur both in the thrust direction and in the disk plane, are caused by the asymmetric airflow fundamental to the lifting rotor in forward flight. Other vibration sources, e.g., small differences among blades, periodic wake loads on the fuselage and control surfaces, the engine, and auxiliary equipment, are usually much less significant.

Vibration is currently reduced by several methods. (1) Blade and fuselage resonances with rotor harmonic frequencies, particularly the blade-number multiple harmonics, are avoided in initial design and are detuned as far as possible during development when they are found to contribute significantly to the problem. (2) Fuselage structure is designed, when possible, to place critical locations such as pilot or passenger seats near nodes of the highly excited modes. (3) Passive isolation systems may be used to separate the rotor and transmission from the fuselage, or the payload from the fuselage, at the most troublesome forcing frequency. (4) Passive force absorbers may be installed on the blade roots, the hub, or the fuselage structure to generate vibratory forces which oppose the natural ones at the most troublesome frequency. Some of these absorbers are fine-tuned continuously in flight by automatic (closed-loop) systems.

SUMMARY OF THE INVENTION

The present invention approaches the problem of helicopter vibration, at least the vibration originating from rotor blade flapping, from a different perspective. It is noted that the center of gravity of the rotor blade changes randomly in flight. According to the present invention the center of gravity changes of the flapping rotor blade are geometrically controlled. As a result of the present invention the changes noted for any two blades are predictable and occur in unison, thereby minimizing vibration at its origin.

BRIEF DESCRIPTION OF THE DRAWINGS

Five figures have been selected to illustrate a preferred embodiment of the present invention. While the figures are schematic, they are sufficiently detailed to render the invention enabling to the person skilled in the relevant art. Included are:

FIG. 1, which is a partial top view of a rotor system embodying the present invention;

FIG. 2, which is a partial view in elevation of the rotor system of FIG. 1;

FIG. 3, which is a partial view in elevation of the rotor system of FIG. 1 with a 5° cyclic condition imposed;

FIG. 4, which is a partial view in elevation of the rotor system of FIG. 1 with a 10° cyclic condition imposed; and FIG. 5, which is a perspective view of the rotor hub according to the present invention but without attached rotor blades.

DETAILED DESCRIPTION

The helicopter rotor 10 according to a preferred embodiment of the present invention is shown in FIGS. 1-5. The rotor 10 includes in its essential elements, a rotor hub 12, at least two diametrically opposed rotor blades 14 and associated pitch housings 16. The pitch housings 16 attach their respective rotor blade to the rotor hub and define with the rotor hub connection a flap hinge 18 for the rotor blade. The pitch housing 16 also include a pitch arm 20 which is connected to a control system (not shown) for changing the pitch of the associated rotor blade. The rotor hub is in turn mounted to a drive shaft 22 and secured thereto for rotation in a conventional manner. The structure and functions noted to this point are also conventional so that further details thereof are not necessary.

The invention as embodied in the preferred embodiment resides in a structure and method for geometrically controlling the center of gravity changes of each pair of diametrically opposed rotor blades 14. For this purpose the pitch housings 16 have been redesigned and a separating plate 24 between diametrically opposed pitch housings introduced.

Each rotor blade 14 possesses a center of gravity 26, the location of which changes along the longitudianal axis 28 of the rotor blade due to the movement of the rotor blade during rotation of the rotor hub. To control this movement of the center of gravity 26, and thereby the dynamic loads developed which are fed back into the rotor and ultimately to the fuselage where they serve as a source of vibration, each pair of diametrically opposed rotor blades is mounted to the rotor hub 12 by their respective pitch housings 16 so that the centers of gravity 26 lie in a straight line 30 which intersects the geometric center 32 of the rotor hub 12 at all cyclic conditions of the rotor. The geometric center 32 lies at the intersection of the mutually orthogonal axes 34 and 36, and horizontal axis 36 coincides, as shown in FIG. 2, with the straight line 30 at a 0° cyclic condition. To achieve this result, the pitch housings 16 and the separating plates 24 are provided.

The separating plates 24 are configured as generally flat plates with end clevises 38 and elongated slots 40. The end clevises 38 serve to mount a pitch housing 16, while the slots 40 are provided for passage of the rotor shaft 22. The slots 40 are of sufficient size to allow for movement of the plates 24 in the direction of the double arrow A, i.e., each plate 24 can move as indicated by the double arrow A to the limit of either of the opposed surfaces 42. These surfaces serve, therefore, as a stop on the movement of the plates 24, and consequently on the flapping motion of the rotor blades.

The pitch housings 16 comprise two parts: a blade root end attachment 44 and a housing 46. The housing defines a bore 48 and a pair of vertically disposed further bores 50 and 52 (FIG. 5). The bore 48 receives a corresponding end 54 (FIG. 1) of the blade root end attachment 44 and secures the end 54 thereto, as for example, by a bearing connection. The bore 50 along with the clevis joint 56 of the rotor hub 12 and a pin 58 define the flap hinge 18, while the bore 52 along with the clevis joint 38 of the separating plate 24 and a pin 60 define the pivot hinge 62 of the pitch housing and its respective separating plate.

In the assemblies shown in FIGS. 2-5, the rotor hub 12, the pitch housings 16 and the separating plate 24 between two diametrically opposed rotor blades form a four-bar linkage which allows for the control noted above, i.e., of the location changes of the centers of gravity 26. As shown in FIG. 2 a preconing angle $\alpha$ is defined between the longitudinal axis 8 of the rotor blades and the horizontal axis 36. This angle may be approximately 5°. With a precone angle and a 0° cyclic condition, as shown in FIG. 2, the straight line 30 intersects not only the geometric center 32, but the flap hinges 18 of each pitch housing 16. With a 5° cyclic condition, as shown in FIG. 3, and a 10° cyclic condition, as shown in FIG. 4, the straight line 30 continues to intersect the geometric center 32. By maintaining the intersection of the straight line 30, with the geometric center 32, a reduction in the loading producing vibrations is achieved.

What is claimed is:

1. A helicopter rotor, comprising:
   a rotor hub having a geometrical center lying on a horizontal axis;
   at least two rotor blades, each defining a longitudinal axis;
   a pitch housing for each rotor blade, each rotor blade being mounted to its respective pitch housing;
   mounting means associated with each pitch housing and its respective rotor blade for mounting the associated pitch housing to the rotor hub and defining thereby a flap hinge for said respective rotor blade; and
   separating means connected to and extending between two diametrically opposed pitch housings mounted on the rotor hub, such that the rotor hub, the diametrically opposed pitch housings and the associated connected separating means form a four-bar linkage with the center of gravity of the diametrically opposed blades lying in a straight line which intersects the rotor hub geometrical center at all cyclic conditions.

2. The helicopter rotor as defined in claim 1, wherein the straight line further intersects the associated flap hinges at a 0° cyclic condition.

3. The helicopter rotor as defined in claim 1, wherein at a 0° cyclic condition the longitudinal axis of each rotor blade forms an acute preconing angle with the horizontal axis.

4. The helicopter rotor as defined in claim 1, wherein the separating means are pivotably connected to their respective pitch housings.

5. The helicopter rotor as defined in claim 1, wherein the four-bar linkage comprises a parallelogram linkage.

6. The helicopter rotor as defined in claim 1, wherein each separating means includes a slot defining diametrically opposed surfaces serving as flap stops limiting the flapping angle of its respective rotor blades.

7. The helicopter rotor as defined in claim 1, wherein each pitch housing includes a housing and a blade root end attachment, said housing defining a bore for receiving and securing the root end attachment of its respective blade and a pair of vertically displaced horizontal bores for mounting the housing to the rotor hub and its respective separating means.

8. A method of reducing rotor induced vibrations in a helicopter having a rotor hub and at least two diametrically opposed rotor blades mounted thereto, comprising the step of:
   mounting each diametrically opposed pair of rotor blades such that their centers of gravity lie in a straight line which intersects the geometrical center of the rotor hub for all cyclic conditions.

9. The method as defined in claim 8, further comprising the step of:
   causing the straight line which intersects the geometrical center of the rotor to further intersect the flap hinges of the associated rotor blades at a 0° cyclic condition.

10. The method as defined in claim 8 further comprising the step of:
    forming an angle of 5° between the longitudinal axis of each rotor blade and the horizontal axis intersecting the geometric center of the rotor hub for a 0° cyclic condition.

* * * * *